Figure 1:
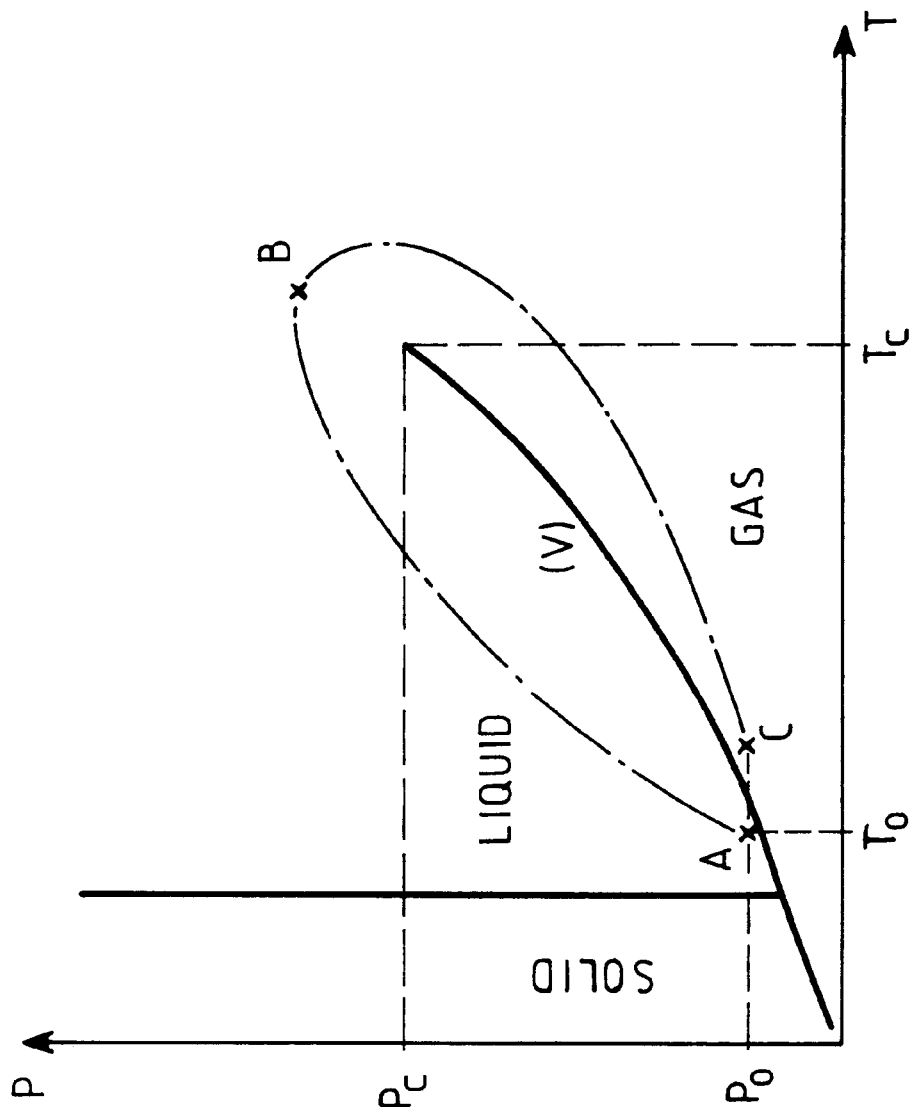

United States Patent [19]
Perrut et al.

[11] Patent Number: 5,962,539
[45] Date of Patent: Oct. 5, 1999

[54] PROCESS AND EQUIPMENT FOR DRYING A POLYMERIC AEROGEL IN THE PRESENCE OF A SUPERCRITICAL FLUID

[75] Inventors: Michel Perrut, Nancy; Eric Francais, Voinemont, both of France

[73] Assignee: Separex S.A., Champigneulles, France

[21] Appl. No.: 09/073,262

[22] Filed: May 6, 1998

[30] Foreign Application Priority Data

May 9, 1997 [EP] European Pat. Off. .............. 97107604

[51] Int. Cl.$^6$ ................................... C08J 9/26; C08J 9/28
[52] U.S. Cl. ................... 521/97; 521/61; 521/64; 521/146; 521/149; 521/155; 521/180; 521/186; 521/187
[58] Field of Search ...................................... 521/186, 187, 521/97, 130, 61, 64, 146, 149, 155, 180

[56] References Cited

U.S. PATENT DOCUMENTS 5,128,382  7/1992  Elliott, Jr. et al. .
5,484,818  1/1996  DeVos et al. ............................ 521/123

FOREIGN PATENT DOCUMENTS

WO 96/36654  11/1996  WIPO .
WO 96/37539  11/1996  WIPO .

*Primary Examiner*—Morton Foelak
*Attorney, Agent, or Firm*—Young & Thompson

[57] ABSTRACT

A process for obtaining an aerogel from a polymeric material that is in the form a sol-gel in an organic solvent, by exchanging the organic solvent for a fluid having a critical temperature below a temperature of polymer decomposition, and supercritically drying the fluid/sol-gel. The process is carried out in a semi-continuous mode that includes the steps of contacting the initial sol-gel with a stream of the fluid at different pressures and temperatures through n+1 pressure vessels $A_0$ to $A_n$ that each have an inlet for fluid $VI_i$ and an outlet for effluent $VO_i$ wherein the n+1 pressure vessels are operated dependently on each other through a joint fluid supply system and a joint effluent treatment system so that the respective product in each of the pressure vessels $A_0$ to $A_n$ is submitted to the fluid in successive steps with pressure and temperature following a curve that never cuts the vaporization curve in the pressure-temperature diagram of FIG. 1.

7 Claims, 4 Drawing Sheets

PROCESS AND EQUIPMENT FOR DRYING A POLYMERIC AEROGEL IN THE PRESENCE OF A SUPERCRITICAL FLUID

DESCRIPTION

The present invention concerns a process and equipment designed for obtaining a highly microporous material from a polymeric material that is initially in the form of a sol-gel in an organic solvent, by using a fluid for substituting the organic solvent prior to its elimination from the polymeric matrix through an operation currently called "supercritical drying", the obtained highly microporous material being called "aerogel".

Aerogels are a unique class of ultrafine cell size, low density, open-celled foams. Aerogels have continuous porosity and their microstructure with pore sizes below the free mean path of air (pore sizes in the nanometer range) is responsible for their unusual thermal properties. More in depth understanding of the aerogel texture and terminology can be found in the following references: D. Schaefer, "Structure of mesoporous aerogels", MRS Bulletin, April 1994, p. 49–53; R. W. Pekala, D. W. Schaefer, "Structure of organic aerogels. 1. Morphology and Scaling", Macromolecules 1993, 26, p. 5487–5493; M. Foret, A. Chougrani, R. Vacker, J. Pelous, "From colloidal-silica sols to aerogels and xerogels", Journal de Physique IV, Colloque C2, supplément au Journal de Physique III, Volume 2, October 1992, p. 135–139; R. W. Pekala, C. T. Alviso, "Carbon aerogels and xerogels", Mat. Res. Soc. Symp. Proc. Vol. 270, 1992, p. 9; Journal of Non Crystalline Solids, Vol. 186, Jun. 2 1995, Chapter 1.

It is known that aerogels can be obtained from sol-gel materials through supercritical drying (see U.S. Pat. No. 2,093,454, U.S. Pat. No. 2,188,007, U.S. Pat. No. 2,249,767 and U.S. Pat. No. 2,260,625).

A sol-gel material consists of a mixture of an (in)organic polymeric material and a solvent (water or any other liquid) and is characterised by the regular structure of the arrangement of the polymeric material at microscopic scale, similarly as it can be found in a crystal of any crystallised solid, but with the difference that a sol-gel is not rigid but soft. An example of a sol-gel is gelatine which is widely used in foodstuffs.

It is of great practical interest to try to eliminate the solvent from such sol-gel material with the aim of obtaining a solvent-free solid material exhibiting the same microscopic structure as the sol-gel. Unfortunately, any classical means of drying always leads to formation of a two phase system inside the material: the solvent gradually turns from liquid into the gas phase with interfaces of liquid and gas throughout the porous material, leading to very large capillary forces especially when the pore diameters are very small. These forces tend to destroy the original structure of the polymeric material in the sol-gel leading to an aerogel, after drying, that exhibits a far smaller porosity with much larger pore diameters than the original sol-gel.

The idea of the prior art was to eliminate the solvent from the sol-gel without generating a two-phase system and the related capillary forces. This is possible through compressing and heating the sol-gel above the critical pressure and temperature of the solvent and then by decompressing it down to atmospheric pressure and cooling it down to room temperature, maintaining the solvent in gas phase without any condensation.

For a better understanding it is to be reminded that for any pure substance, the vaporisation curve defined as the temperature of vaporization of the substance versus pressure, exhibits an end-point called critical point, at the critical temperature and critical pressure. So it is said that a fluid is in supercritical state when its pressure and temperature are respectively higher than the critical pressure and temperature.

Referring to FIG. 1 representing a pressure/temperature curve, it is easy to understand that the sol-gel mixture (point A at room pressure and temperature) can be pressurised and heated to reach supercritical state (point B) and then depressurised and cooled to reach again room conditions (point C); during this operation, the solvent vaporisation curve (V) is never crossed: so, at no time any two-phase solvent system appears, and finally, only a low pressure solvent vapour is present in the porous aerogel that is further filled with air by diffusion as the aerogel is highly porous with open pores.

This concept has been widely used up to large scale, mainly for inorganic polymers and especially with silica: silica sol-gels are commonly obtained by decomposition of various organic derivatives of silicium, using water or more often ethanol as solvent. Such sol-gels are dried according to the supercritical drying concept and highly microporous aerogels are obtained, that find applications in optics, heat insulation, nuclear energy, catalyst manufacture, and many others.

However, this process cannot be directly adapted to most organic polymeric sol-gels as the solvents in which they are obtained exhibit critical temperatures higher than the temperatures at which such polymers decompose, this contrary to silica that is extremely stable.

In the case of such organic polymeric sol-gels, supercritical drying can only be realised after exchange of the organic solvent initially used to prepare the sol-gel into a fluid that exhibits a critical temperature low enough to permit this drying without polymer decomposition. As liquid carbon dioxide is totally miscible with most of the organic solvents used for such organic polymeric sol-gel preparation and as its critical temperature is only 304.2 K, it appears as the ideal candidate for such an exchange.

Thus, as described in the prior art (see U.S. Pat. No. 5,476,878, WO 95/13132 and WO 95/03358) the supercritical drying process of the $CO_2$/sol-gel is easily operated as described herebefore, after a first step during which the organic solvent is eliminated by a flow of liquid $CO_2$ through the initial sol-gel; this does not lead to any destruction of the sol-gel structure as the use of $CO_2$, being totally miscible with the organic solvent, does not lead to liquid-liquid interfaces and related capillary forces.

The present invention relies on these concepts but describes a new way to operate such exchange and drying process leading surprisingly to a very high quality aerogel and an equipment permitting to implement such process in a much more economical way than the classical batch operation.

Basically, supercritical drying of aerogels is operated in a batch mode: a pressure vessel is filled with the sol-gel mixture; the fluid, classically liquid carbon dioxide, is slowly introduced to pressurise the vessel and further to entrain the organic solvent from the sol-gel; afterwards, the $CO_2$/sol-gel is heated, then decompressed and cooled to room conditions. This operation often requires several hours and is obviously very costly as most parts of the equipment, including the means to pressurise and depressurize the fluid, and to separate the organic solvent from the fluid are only used during a short period of the drying cycle; extrapolation to very large scale for industrial manufacture of aerogels appears not at all compatible with economical constraints.

According to the present invention, it is proposed to operate this supercritical drying of aerogels in a semi-continuous mode, using a simulated continuous operation, that leads to surprisingly high aerogel quality and very low operating costs.

Figure 2:
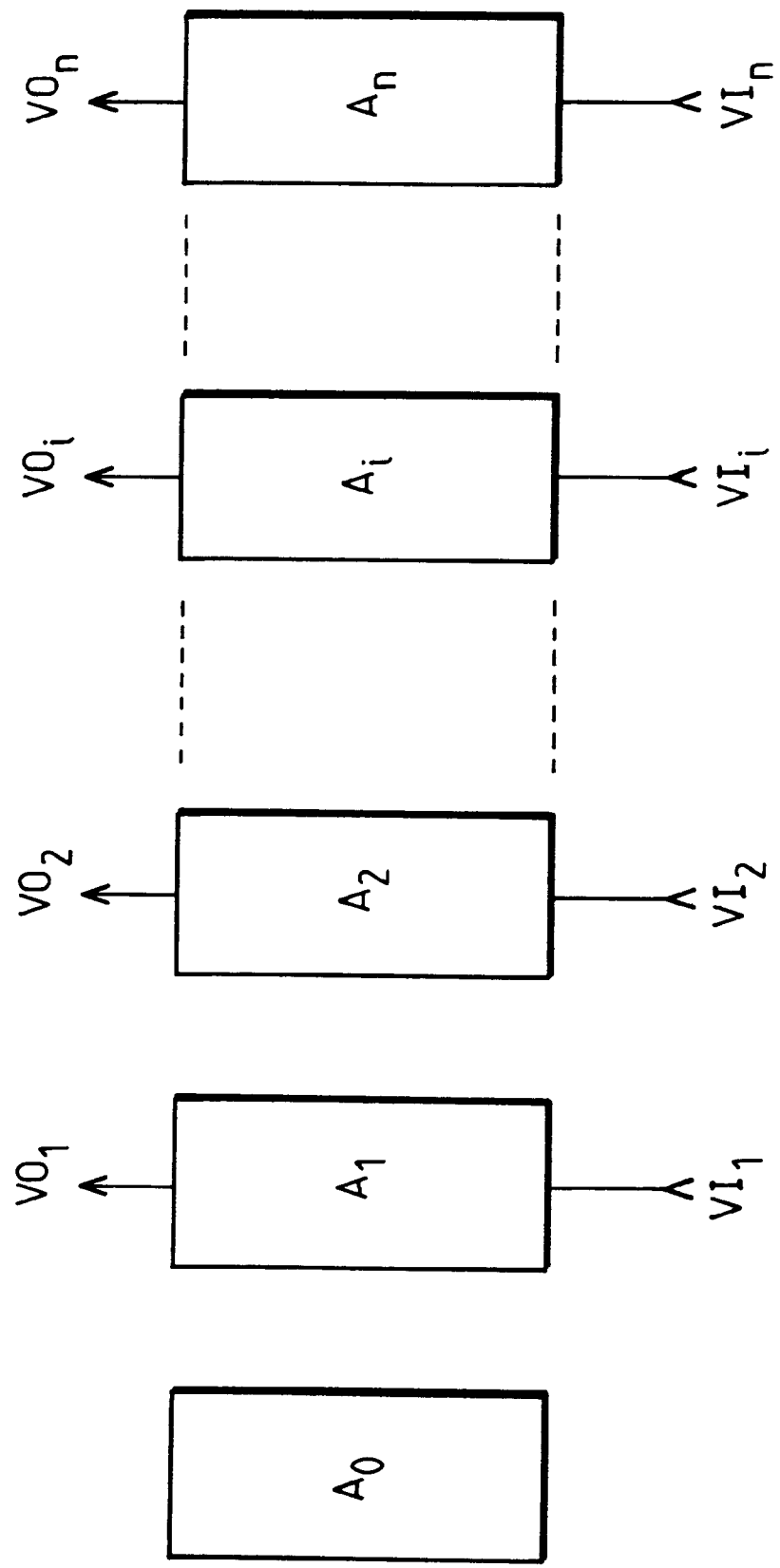

For a better understanding, reference is made to FIG. 2 where a basic flowsheet of the process is presented, just as a simple but non-limitative illustration of the present invention.

The process consists of contacting the initial sol-gel with a stream of $CO_2$ at different pressures and temperatures, through a number (n+1) of pressure vessels called ($A_0$) to ($A_n$).

At a given time, vessel $A_j$ is at room temperature and pressure for operating the loading of sol-gel. From this time, vessel $A_1$, already filled with sol-gel is swept by liquid $CO_2$ at conditions referred by point $A_1$ on the diagram presented in FIG. 3; during this phase of treatment lasting from $t_0$ to $t_0+\Delta t$, the organic solvent is gradually replaced by liquid $CO_2$ and the mixture $CO_2$ and organic solvent exiting from vessel $A_1$ is sent to a separation system similar to those used classically in supercritical fluid extraction equipments.

Figure 3:
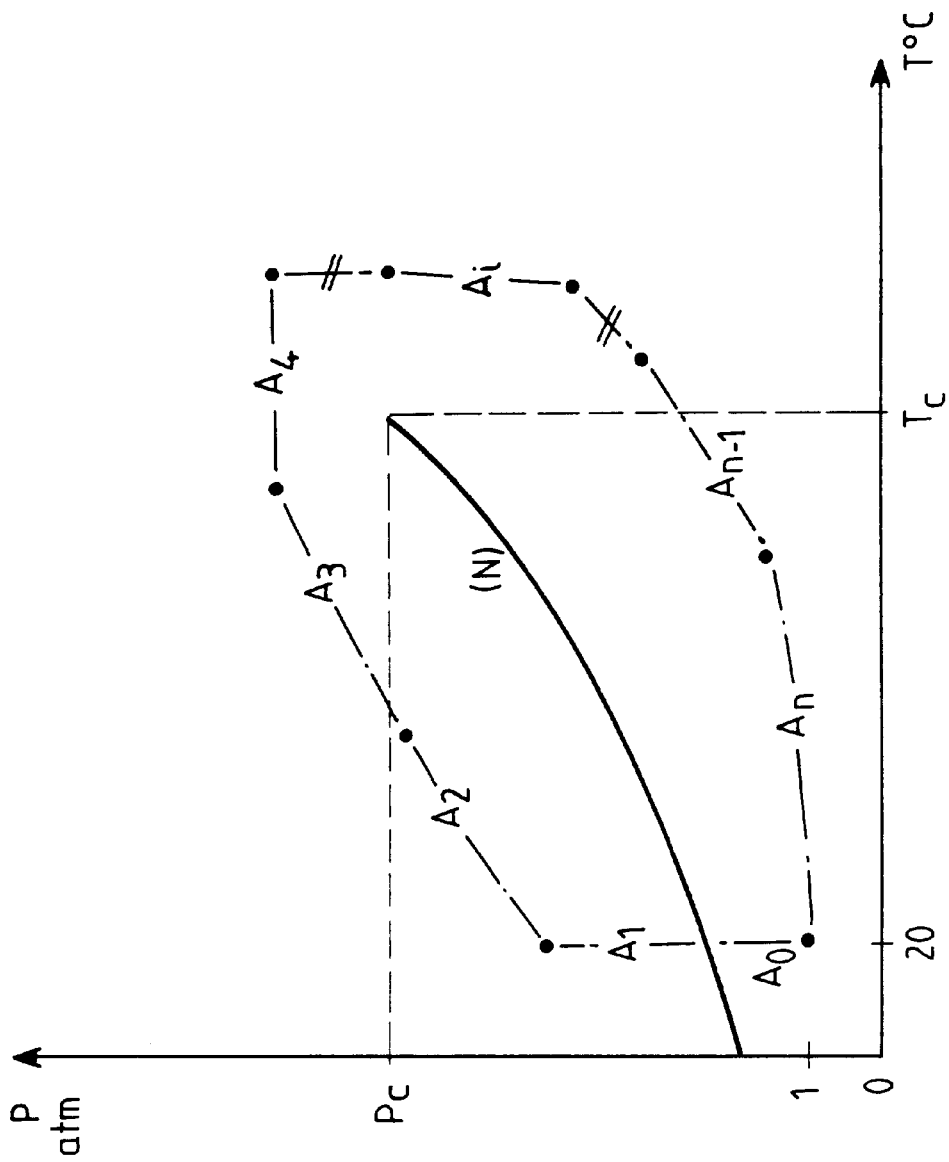

At time $t_0+\Delta t$, $CO_2$ has totally replaced the organic solvent and the sol-gel will be subjected to supercritical drying by percolating $CO_2$ at temperatures and pressures so as to reach the conditions noted as $A_2, A_3, \ldots, A_i$ on FIG. 3 at time $t_0+2\Delta t, t_0+3\Delta t, \ldots, t+i\Delta t$ and finally $A_{n-1}$ at time $t_0+(n-1)\Delta t$. In order to facilitate $CO_2$ elimination in a short time without degradation of the aerogel due to dry ice formation in the final depressurization step, compressed air is injected from time $t_0+(n-1)\Delta t$ instead of $CO_2$ at a pressure that is decreased so that, at time $t_0+n\Delta t$ the aerogel is available at room conditions, permitting to open the vessel and withdraw the aerogel prior to filling it again with fresh sol-gel.

In fact, the invention consists of realizing such sequence on each of the (n+1) vessels at the same moment so that $CO_2$ and compressed air consumption is minimised and aerogel production maximised. It is easy to understand that, if a certain number of vessels are operated independently from each other, no savings could be obtained in comparison with one unique vessel in batch mode.

According to the present invention, a co-ordination of the steps of solvent elimination and supercritical drying leads to a semi-continuous production of aerogel at an optimised cost. This consists of operating at any time, one of the n steps $A_i$–$A_{i+1}$, on one of the n vessels while one vessel is opened for aerogel withdrawing and fresh sol-gel introduction.

As illustrated in examples herebelow, it is easy to supply continuously at n ports (noted $VI_i$ for vessel $A_i$) the fluids, $CO_2$ or compressed air, in the adequate conditions (pressure, temperature, flowrate) and to connect these to one of the n vessels that require such fluid in such conditions at the present moment.

Similarly, it is easy to treat the effluents from the n vessels in n systems of fluid purification and recycling adapted for each of the n effluents, noted $VO_i$ for vessel $A_i$.

Briefly speaking, the sol-gel treatment in each vessel follows the classical curve presented in FIG. 3 while the fluid supply system and the effluent treatment system works continuously. So, between times $t_0$ and $t_0+\Delta t$, the operation of each vessel $A_i$ is as represented in FIG. 3. Between times $t_0+\Delta t$ and $t_0+2\Delta t$, the operation of vessel $A_0$ is the same as it was in the previous period in vessel $A_1$, and similarly for each vessel $A_i$ operated as in the previous period in vessel $A_{i+1}$, and finally vessel $A_n$ is opened for withdrawal of the aerogel and filling with fresh sol-gel, as was done in vessel $A_0$ in the previous period.

For the next period between $t_0+2\Delta t$ and $t_0+3\Delta t$ vessel $A_j$ is operated as vessel $A_{i+1}$ in the period between $t_0+\Delta t$ and $t_0+2\Delta t$, or vessel $A_{i+2}$ in the first period between $t_0$ and $t_0+\Delta t$. And so on for the next periods of time between $t_0+i\Delta t$ and $t_0+(i+1)\Delta t$, the cycle being completed for the last period of time between $t_0+n\Delta t$ and $t_0+(n+1)\Delta t$.

So, it is clear to understand that through this cycling operation each vessel is subjected to the whole treatment cycle described herebefore for one unique vessel working batchwise and that, at any moment, the configuration is similar to that described for the first period of the cycle between time $t_0$ and $t_0+\Delta t$, with the difference that the starting vessel initially $A_0$ during this period is presently $A_j$, j being a number between 1 and (n+1).

This sequential procedure is qualified as simulated continuous drying as it is obviously not continuous, but can be operated as continuous, leading to a highly reproducible quality of the aerogel and very significant savings in operation costs while the production capacity of a given equipment is increased.

In an optimised process, several steps could either require fluid in similar conditions or deliver effluents that can be treated in the same system, which leads to significant savings through the use of a lower number of fluid supply and effluent treatment systems than the number of vessels.

The above process can be used for the production of any type of organic aerogel. Examples include melamine/formaldehyde aerogels, resorcinol/formaldehyde aerogels, furfural/formaldehyde aerogels and derivatives thereof, other polymeric organic aerogels based on styrene, acrylate, alkene chemistry and others based on addition polymerisation reactions and preferably aerogels based on polyisocyanate chemistry such as described in WO 95/03358, WO 96/36654 and WO 96/37539.

These polyisocyanate based aerogels are prepared by mixing a polyisocyanate and a catalyst and optionally a polyfunctional isocyanate-reactive compound in a suitable solvent and maintaining said mixture in a quiescent state for a sufficiently long period of time to form a polymeric gel. The gel so formed is then supercritically dried.

Polyisocyanates for use in said method for preparing the polyisocyanate-based aerogels include aliphatic, cycloaliphatic, araliphatic and aromatic polyisocyanates known in the literature for use generally in the production of polyurethane/polyisocyanurate materials. Of particular importance are aromatic polyisocyanates such as tolylene and diphenylmethane diisocyanate in the well known pure, modified and crude forms, in particular diphenylmethane diisocyanate (MDI) in the form of its 2,4'-, 2,2'- and 4,4'-isomers (pure MDI) and mixtures thereof known in the art as "crude" or polymeric MDI (polymethylene polyphenylene polyisocyanates) having an isocyanate functionality of greater than 2 and the so-called MDI variants (MDI modified by the introduction of urethane, allophanate, urea, biuret, carbodiimide, uretonimine or isocyanurate residues).

The polyisocyanate is used in amounts ranging from 0.5 to 30% by weight, preferably from 1.5 to 20% by weight and more preferably from 3 to 10% by weight based on the total reaction mixture.

Trimerisation catalysts for use in the said preparation method include any isocyanate trimerisation catalyst known in the art such as quaternary ammonium hydroxides, alkali metal and alkaline earth metal hydroxides, alkoxides and carboxylates, for example potassium acetate and potassium 2-ethylhexanoate, certain tertiary amines and non-basic metal carboxylates, for example lead octoate, and symmetrical triazine derivatives. Specific preferred trimerisation catalysts for use in the present method are Polycat 41 available from Abbott Laboratories, and DABCO TMR, TMR-2, TMR-4 and T 45 available from Air Products, and potassium salts like potassium octoate and potassium hexanoate.

The polyisocyanate/catalyst weight ratio varies between 5 and 1000, preferably between 5 and 500, most preferably between 20 and 100. The preferred polyisocyanate/catalyst weight ratio depends on the amount of polyisocyanate used, the reaction/cure temperature, the solvent used, additives used.

The solvent to be used in the said preparation method should be a solvent for the monomeric (non-reacted) polyisocyanate as well as for the polymeric (reacted) polyisocyanate. The solvent power should be such as to form a homogeneous solution of non-reacted compounds and to dissolve the reaction product or at least prevent flocculation of the reaction product. Solvents with a $\delta$ solubility parameter between 0 and 18 $MPa^{1/2}$ and a hydrogen bonding parameter $\delta_H$ between 0 and 15 $MPa^{1/2}$ are most suitable.

Suitable solvents for use in the method according to the present invention include hydrocarbons, dialkyl ethers, cyclic ethers, ketones, alkyl alkanoates, aliphatic and cycloaliphatic hydrofluorocarbons, hydrochlorofluorocarbons, chlorofluorocarbons, hydrochlorocarbons, halogenated aromatics and fluorine-containing ethers. Mixtures of such compounds can also be used.

Preferred solvents for use in the method according to the present invention are dichloromethane, methyl ethyl ketone, acetone, tetrahydrofuran, monochlorobenzene, trichlorofluoromethane (CFC 11), chlorodifluoromethane (HCFC 22), 1,1,1-trifluoro-2-fluoroethane (HFC 134a), 1,1-dichloro-1-fluoroethane (HCFC 141b) and mixtures thereof such as HCFC 141b/CFC 11 mixtures, 1,1,1,3,3-pentafluoropropane (HFC245fa), 1,2-difluoroethane (HFC 152), difluoromethane (HFC 32) and 1,1,1,3,3-pentafluorobutane (HFC 365 mfc).

The mixture of polyisocyanate, catalyst and solvent is left standing for a certain period of time to form a polymeric gel. This time period varies from 10 seconds to several weeks depending on the system and the targeted void size and density.

Temperatures in the range of from about −50° C. to about 50° C., preferably 0 to 45° C. may be employed.

Although the mixture gels within a few minutes, it has been found to be advantageous to cure the gels for a minimum of 24 hours so as to obtain a solid gel that can be easily handled in subsequent processing. A postcure cycle at elevated temperatures can be included.

Before the supercritical drying step the gel is exchanged into a solvent more suitable for supercritical drying, for example liquid carbon dioxide, possibly via an intermediate solvent such as acetone or via liquid carbon dioxide containing modifiers.

Further suitable additives to be used in the polyisocyanate-based aerogel preparation process and further suitable processing methods are described in WO 95/03358, WO 96/36654 and WO 96/37539, all incorporated herein by reference.

The following examples are presented as non-limitative illustrations of the invention.

EXAMPLE 1

Batch aerogel drying.

This concerns the basic conditions for treating a sol-gel of polyisocyanurate obtained by polymerisation of polymeric MDI in dichloromethane as solvent in only one vessel A connected to fluid supplies through valve VI and to separation systems through valve VO.

Initially 33 kg of sol-gel were introduced in a vertical cylindrical pressure vessel of a net volume of 25 liters at room temperature and atmospheric pressure. After closure of the vessel, liquid $CO_2$ at 10° C. was introduced through valve VI from the top of the vessel at a flowrate of 24 $kg.h^{-1}$; pressure was built up to 60 bar after 10 minutes.

Then, the $CO_2$ flowrate through VI was set at 42 $kg.h^{-1}$ and its temperature was gradually increased from 10 to 55° C. during a period of 35 minutes; after the first 10 minutes, the pressure reached 100 bar; at that moment, the outlet valve VO was opened and the mixture $CO_2$ and dichloromethane was withdrawn through a pressure relief system that maintains the pressure inside the vessel at 100 bar; the mixture $CO_2$ and dichloromethane was decompressed and reheated in separators where gaseous $CO_2$ and liquid dichloromethane were withdrawn, $CO_2$ being recycled through liquefaction and pumping, as commonly practised in supercritical fluid extraction equipment; the temperature of 55° C. was reached throughout the pressure vessel at the end of a total period of 35 minutes.

Then, during a period of 90 minutes, the $CO_2$ flowrate through VI was maintained at 66 $kg.h^{-1}$ at a temperature of 55° C.; the pressure inside the vessel was maintained at 100 bar, the fluid flowing through VO to the same pressure relief system and the same separation system.

After these operations, the said pressure relief system was gradually activated to decrease the pressure in the pressure vessel from 100 to 15 bar during a period of 35 minutes while the $CO_2$ flowrate was maintained at 40 $kg.h^{-1}$ at a temperature maintained at 55° C. at the vessel inlet VI.

Then, the $CO_2$ flowrate was stopped and dry compressed air from a source at 20 bar was introduced through valve VI with a flowrate of 10 $kg.h^{-1}$, at a temperature of 20° C., while the pressure in the pressure vessel was gradually decreased from 15 to 1 bar by activating the pressure relief system following valve VO, this $CO_2$-air mixture being vented to atmosphere at the vessel outlet VO, this being completed over a period of 10 minutes. Finally, the vessel was opened and 1.4 kg of aerogel was recovered after a total treatment time of 180 minutes.

The obtained aerogel exhibits a very low heat conductivity both at atmospheric pressure (Lambda=22 mW/mK) and under vacuum (Lambda=7 mW/mK) due to a low specific gravity of 140 $kg.m^{-3}$ and very large porosity of 90% and specific area of 540 $m^2.kg^{-1}$, showing that the drying operation does not alter the microscopic structure of the gel.

EXAMPLE 2

Simulated continuous drying equipment.

This concerns a description of a type of equipment designed to implement the solvent exchange and supercritical drying operation according to the present invention.

As presented in a simplified flowsheet (FIG. 4), the equipment consists of 5 identical vertical cylindrical pressure vessels ($A_0$ to $A_4$), similar to the vessel used in example 1, each connected at the top through port $VI_i$ to 4 fluid supply lines $L_i$ and at the bottom through port $VO_i$ and pressure relief system $Pr_i$ to 3 effluent lines.

Said supply lines called $L_j$ are connected to each vessel port $VI_i$ through valves called $V_{ji}$ connecting line $L_j$ to pressure vessel $A_i$, that can be operated manually or by an automatic control system. Said supply lines are themselves connected to two $CO_2$ reservoirs $R_1$ and $R_2$ and one compressed air reservoir $R_3$, one $CO_2$ reservoir $R_1$ being at 110 bar and 20° C., the other one $R_2$ being at 110 bar and 55° C., the air reservoir $R_3$ being at 20 bar and 20° C. Said effluent lines are connected to each vessel port $VO_i$ and pressure relief system $Pr_i$ through a valve called $V'_{ji}$ connecting separation system $S_j$ to pressure vessel $A_i$ that can be operated manually or by an automatic control system. Said effluent lines are themselves connected to three separation systems $S_1$, $S_2$ and $S_3$, $S_1$ being designed to separate $CO_2$ and dichloromethane mixtures containing a large concentration of dichloromethane estimated at more than 1% mass, $S_2$ being designed to separate $CO_2$ and dichloromethane mixtures containing low concentration of dichloromethane, estimated below 1% mass, $S_3$ being a simple vessel connected to atmosphere through a vent line $V_e$.

Carbon dioxide exiting from separators $S_1$ and $S_2$ is recirculated to reservoirs $R_1$ and $R_2$ through recycle system $R_e$ consisting of compression and cooling to the temperatures of 10 and 55° C. respectively. Dry compressed air is obtained through the compression system $C_0$ and stored in reservoir $R_3$. Carbon dioxide temperature $T_4$ in line $L_4$ is controlled by mixing streams coming from reservoirs $R_1$ and $R_2$ through classical control system operating control valves, called $C_T$.

Thus, this equipment is designed to permit an easy implementation of the process of the present mention, especially if an automatic control system facilitates all the valve controls, pressure temperature and flowrate regulations in each line and vessel.

EXAMPLE 3

Simulated continuous drying operation.

Figure 4:
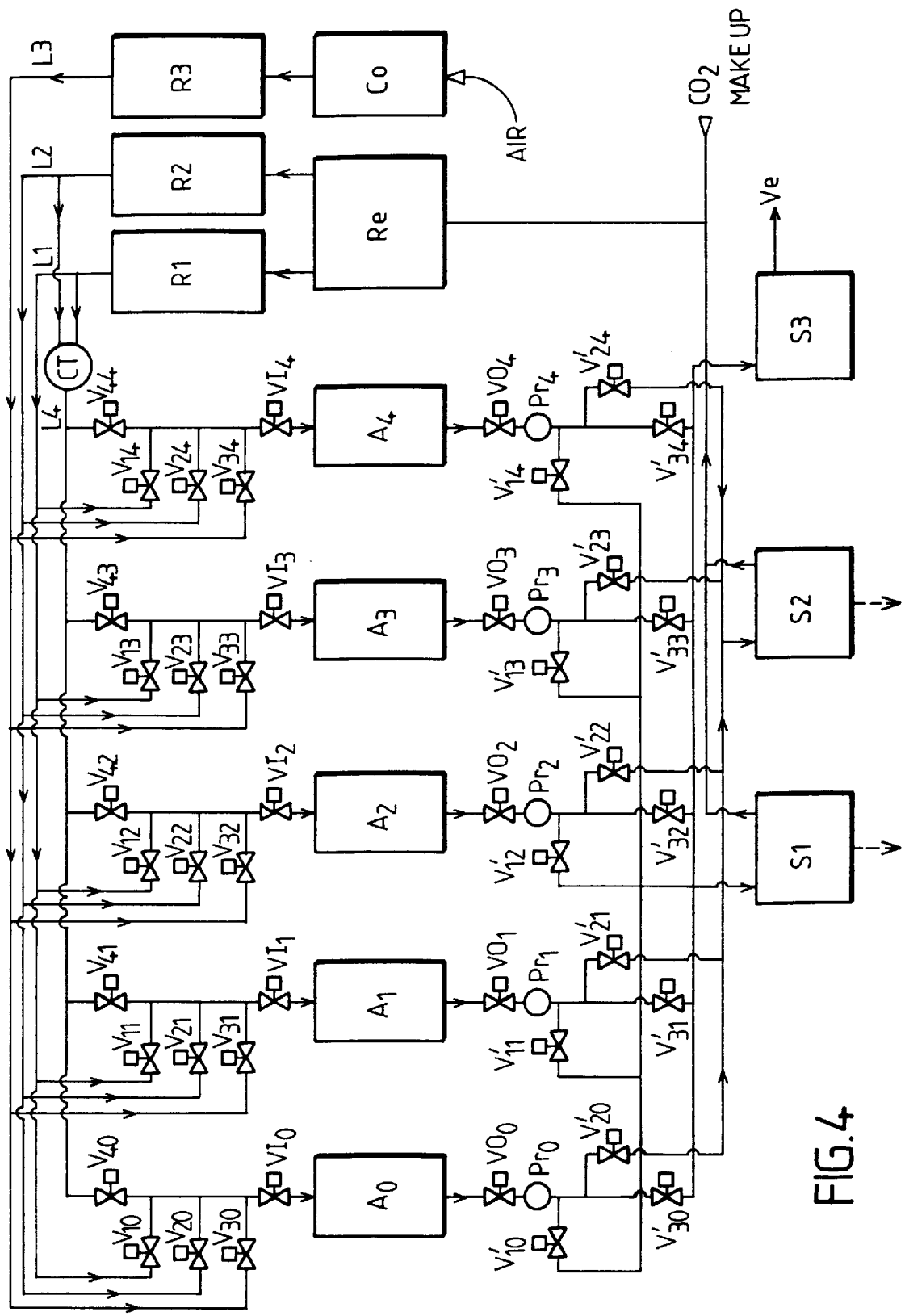

A fully automated equipment according to the process flowsheet of example 2 and schematically presented in FIG. 4, was built with cylindrical vertical pressure vessels of 25-liters net volume, similar to the pressure vessel used in example 1.

During operation of the simulated continuous drying, the system was in the state as presented in Table 1 at the time $t_0$, considered to be the beginning of a cycle of 5 periods of 45 minutes.

TABLE 1

| Vessel | Pressure (bar) | Temperature (°C.) | Connections | Situations |
|---|---|---|---|---|
| $A_0$ | 1 | 20 | All valves closed | Fresh sol-gel |
| $A_1$ | 100 | 55 | $VI_1$, $VO_1$ open $V_{41}$, $V'_{11}$ open | Most solvent is eliminated |
| $A_2$ | 100 | 55 | $VI_2$, $VO_2$ open $V_{22}$, $V'_{22}$ open | Solvent almost totally eliminated |
| $A_3$ | 100 | 55 | $VI_3$, $VO_3$ open $V_{23}$, $V'_{23}$ open | Solvent is totally eliminated |
| $A_4$ | 1 | 20 | $VI_4$ closed $VO_4$, $V'_{34}$ open | Dry aerogel |

At $t_0$, the actions as presented in Table 2 were operated.

TABLE 2

| Vessel | Connections | Operations | |
|---|---|---|---|
| $A_0$ | open $VI_0$ open $V_{10}$ | Set $Pr_0$ at 100 bar | $CO_2$ flowrate: 24 kg.h$^{-1}$ |
| $A_1$ | close $V_{41}$, $V'_{11}$ open $V_{21}$, $V'_{21}$ | No change | $CO_2$ flowrate: 66 kg.h$^{-1}$ |
| $A_2$ | No change | No change | $CO_2$ flowrate: kg.h$^{-1}$ |
| $A_3$ | No change | Set $Pr_0$ gradually 100 bar to 20 bar upon 35 minutes | $CO_2$ flowrate: 40 kg.h$^{-1}$ |
| $A_4$ | close all valves | Open the vessel for aerogel withdrawl and sol-gel filling | No fluid |

At time $t_0$+10 minutes, changes only occured in vessel $A_0$ as shown in Table 3.

TABLE 3

| Vessel | Connections | Operations | |
|---|---|---|---|
| $A_0$ | close $V_{10}$ open $V_{40}$ | Set temperature $T_4$ gradually from 10 to 55° C. upon 35 minutes | $CO_2$ flowrate: 42 kg.h$^{-1}$ |

At time $t_0$+35 minutes, changes only occured in vessel $A_3$ as shown in Table 4.

TABLE 4

| Vessel | Connections | Operations | |
|---|---|---|---|
| $A_3$ | close $V_{23}$ $V'_{23}$ open $V_{33}$ $V'_{33}$ | Set $Pr_0$ gradually from 20 to 1 bar upon 10 minutes | Air flowrate: 10 kg.h$^{-1}$ |

At time $t_0$+45 minutes, the second period of the cycle began. All operations listed hereabove during the first period of 45 minutes were executed, moving vessel $A_i$ to vessel $A_{i-1}$; $A_0$ was operated as $A_1$, $A_1$ as $A_2$, $A_2$ as $A_3$, $A_3$ as $A_4$ and $A_4$ as $A_0$.

And so on at time $t_0$+90 minutes, $t_0$+135 minutes, $t_0$+180 minutes and $t_0$+225 minutes; at that time, the situation was the same as at $t_0$, the cycle was over and another one started.

So, during this 225 minutes cycle, 165 kg of fresh sol-gel were treated leading to 7 kg of aerogel whose characteristics appeared to be very similar from one vessel to the other and almost equal to those obtained in example 1.

We claim:

1. A process for obtaining an aerogel from a polymeric material that is in the form a sol-gel in an organic solvent, the process comprising the steps of:

exchanging the organic solvent for a fluid having a critical temperature below a temperature of polymer decomposition;

supercritical drying the fluid/sol-gel;

wherein the exchanging and supercritical drying steps are carried out in a semi-continuous mode that includes the steps of contacting the initial sol-gel with a stream of the fluid at different pressures and temperatures through n+1 pressure vessels $A_0$ to $A_n$ that each have an inlet for fluid $VI_i$ and an outlet for effluent $VO_i$ wherein the n+1 pressure vessels are operated dependently on each other through a joint fluid supply system and a joint effluent treatment system so that the respective product in each of the pressure vessels $A_0$ to $A_n$ is submitted to the fluid in successive steps with pressure and temperature following a curve that never cuts the vaporization curve in the pressure-temperature diagram of FIG. 1.

2. Process according to claim 1 wherein said fluid is liquid carbon dioxide.

3. Process according to claim 1 wherein the organic solvent is dichloromethane.

4. Process according to claim 1 wherein the organic solvent is acetone.

5. The process of claim 1, wherein the successive steps with pressure and temperature following a curve start with a pressure and a temperature so that the fluid in the pressure vessel is in a liquid state, and thereafter increase the pressure and temperature to a pressure higher than a critical pressure and a temperature higher than a critical temperature so that the fluid is not in a liquid or gaseous state and then decrease the pressure and temperature so that the fluid enters a gaseous state, and the successive steps reach an end of a cycle when the fluid reaches an initial pressure in a gaseous state, whereby the fluid does not change state directly from a liquid to a gas.

6. The process of claim 1, wherein the exchanging and supercritical drying steps are carried out in each of the pressure vessels and the pressure containers are operated dependently on each other so that concurrently each of the pressure containers is performing a different one of the successive steps.

7. A process for obtaining an aerogel from a polymeric material that is in the form a sol-gel in an organic solvent, the process being carried out in plural pressure containers that are each connected to a common supply system, and comprising the steps of:

exchanging the organic solvent for a fluid from the common supply system having a critical temperature below a temperature of polymer decomposition;

supercritical drying the fluid/sol-gel;

wherein the exchanging and supercritical drying steps are carried out in each of the pressure containers and include successive steps of contacting the initial sol-gel with a stream of the fluid at different pressures and temperatures wherein the pressure containers are operated dependently on each other so that concurrently each of the pressure containers is performing a different one of the successive steps; and the successive steps submitting the product in each of the pressure containers to the fluid with pressure and temperature following a curve that starts with a pressure and a temperature so that the fluid is in a liquid state, and thereafter increase the pressure and temperature to a pressure higher than a critical pressure and a temperature higher than a critical temperature so that the fluid is not in a liquid or gaseous state and then decrease the pressure and temperature so that the fluid enters a gaseous state, and the successive steps reach an end of a cycle when the fluid reaches an initial pressure in a gaseous state, whereby the fluid does not change state directly from a liquid to a gas.

* * * * *